United States Patent
Spiegl et al.

(10) Patent No.: US 10,491,452 B2
(45) Date of Patent: Nov. 26, 2019

(54) METHOD AND SYSTEM FOR CLUSTERED REAL-TIME CORRELATION OF TRACE DATA FRAGMENTS DESCRIBING DISTRIBUTED TRANSACTION EXECUTIONS

(71) Applicant: Dynatrace LLC, Waltham, MA (US)

(72) Inventors: Helmut Spiegl, Linz (AT); Stefan Chiettini, St. Georgen an der Gusen (AT)

(73) Assignee: Dynatrace LLC, Waltham, MA (US)

(*) Notice: Subject to any disclaimer, the term of this patent is extended or adjusted under 35 U.S.C. 154(b) by 523 days.

(21) Appl. No.: 15/264,909

(22) Filed: Sep. 14, 2016

(65) Prior Publication Data

US 2017/0078137 A1 Mar. 16, 2017

Related U.S. Application Data

(60) Provisional application No. 62/218,113, filed on Sep. 14, 2015.

(51) Int. Cl.
*G06F 15/16* (2006.01)
*H04L 12/24* (2006.01)
*H04L 29/08* (2006.01)

(52) U.S. Cl.
CPC ........ *H04L 41/046* (2013.01); *H04L 67/1097* (2013.01); *H04L 67/22* (2013.01)

(58) Field of Classification Search
CPC .. G06F 9/466; G06F 11/1402; G06F 11/3495; G06F 8/20; G06F 16/9574; G06Q 10/10; G06Q 20/04; H04L 41/0816; H04L 43/022; H04L 67/1034; H04L 67/22; H04L 43/10

See application file for complete search history.

(56) References Cited

U.S. PATENT DOCUMENTS

| | | | |
|---|---|---|---|
| 6,230,201 B1 * | 5/2001 | Guck | G06Q 20/04 |
| | | | 705/35 |
| 7,606,814 B2 * | 10/2009 | Deily | G06F 16/9574 |
| 8,234,631 B2 | 7/2012 | Greifeneder et al. | |
| 8,464,225 B2 | 6/2013 | Greifeneder | |

(Continued)

*Primary Examiner* — Dustin Nguyen
(74) *Attorney, Agent, or Firm* — Harness, Dickey & Pierce, P.L.C.; Timothy D. MacIntyre

(57) ABSTRACT

A system and method is disclosed that provides fail-save, scalable and clustered correlation of transaction trace data. The transaction trace data is provided by a set of agents injected into application processes and processed by a set of clustered correlation servers. Each agent monitors parts of transaction executions performed by the application process into which it is injected. The agents generate transaction trace data fragments describing the transaction execution part and report those transaction trace data fragments to the correlation cluster. Routing of transaction trace data from agents to correlation servers is performed in a way that transaction data fragments describing a specific transaction are received by one correlation server regardless of the agent sending it. Intermediate nodes may be used to server as proxy between agents and the correlation server cluster to further improve the availability and failure tolerance of the monitoring system.

23 Claims, 9 Drawing Sheets

Overview

(56) References Cited

U.S. PATENT DOCUMENTS

| | | | |
|---|---|---|---|
| 2004/0122942 A1* | 6/2004 | Green | H04L 43/022 709/224 |
| 2004/0123293 A1* | 6/2004 | Johnson | G06F 9/466 718/101 |
| 2005/0021708 A1* | 1/2005 | Raghuraman | G06Q 10/10 709/223 |
| 2009/0106746 A1* | 4/2009 | Chaudhuri | G06F 8/20 717/158 |
| 2010/0235494 A1* | 9/2010 | Sood | H04L 67/22 709/224 |
| 2010/0268797 A1* | 10/2010 | Pyrik | H04L 41/0816 709/220 |
| 2012/0297371 A1* | 11/2012 | Greifeneder | G06F 11/3495 717/128 |
| 2014/0297846 A1* | 10/2014 | Hoja | H04L 43/10 709/224 |
| 2014/0317449 A1* | 10/2014 | Kohno | G06F 11/1402 714/15 |
| 2016/0094644 A1* | 3/2016 | Elias | H04L 67/1034 709/201 |

* cited by examiner

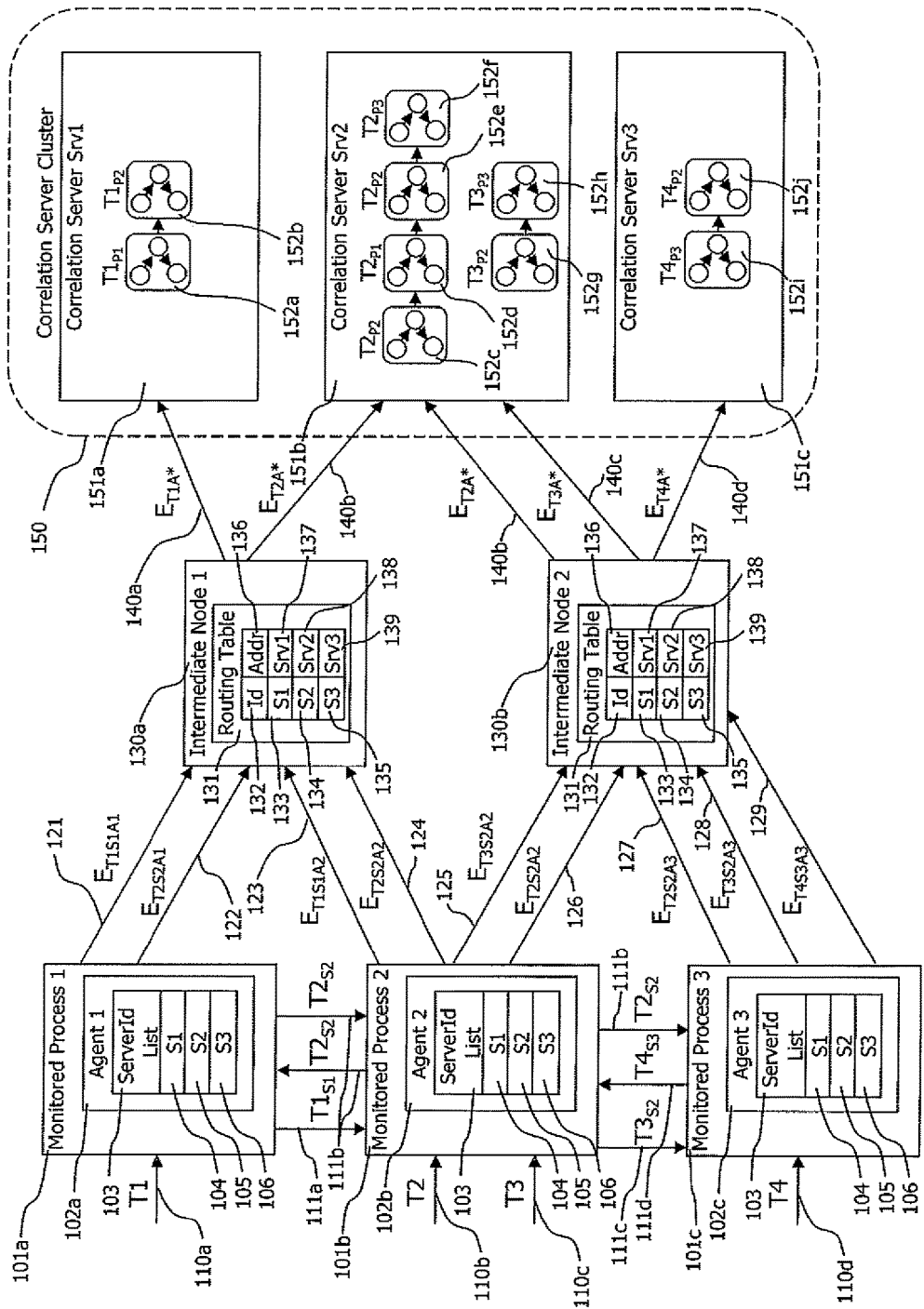
FIG 1: Overview

FIG 2: Trace Data Records
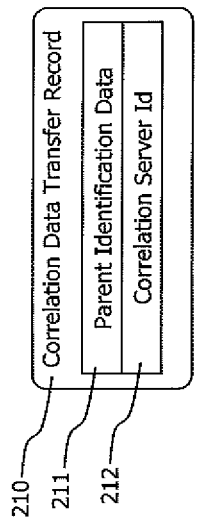
FIG 2a: Trace Event Record
201 — Trace Event Record
202 — Parent Identification Data
203 — Local Identification Data
204 — Thread Internal Correlation Data
205 — Correlation Server Id
206 — Measurement Data
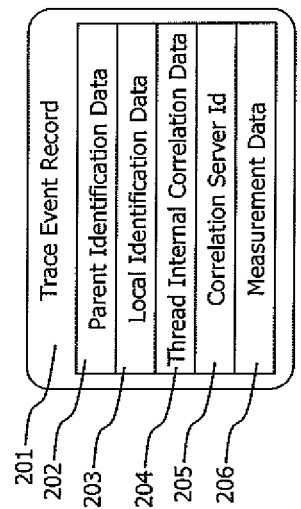
FIG 2b: Correlation Data Transfer Record
210 — Correlation Data Transfer Record
211 — Parent Identification Data
212 — Correlation Server Id

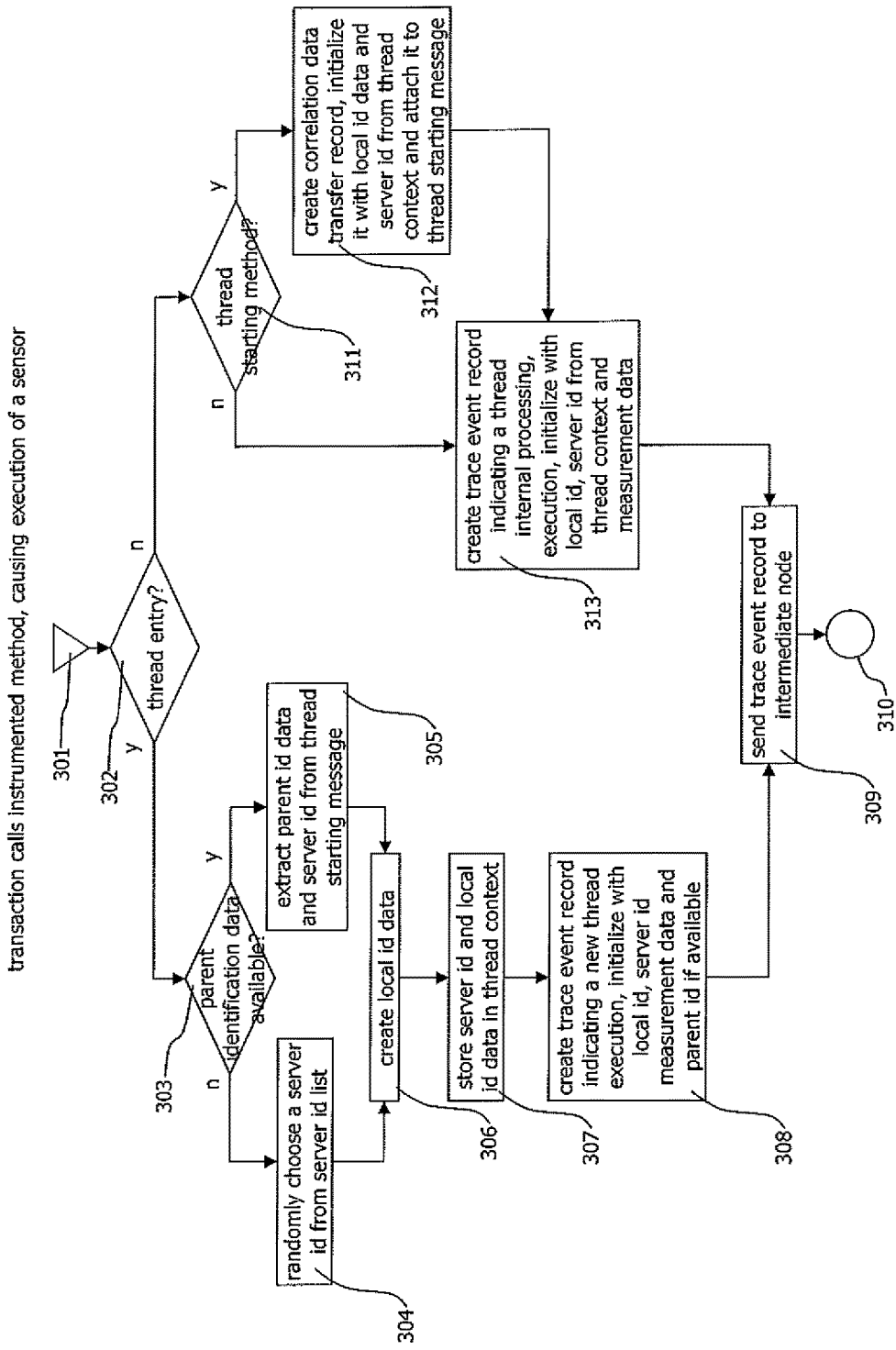
FIG 3: Execution of Sensor Instrumented to Code Executed by Transaction

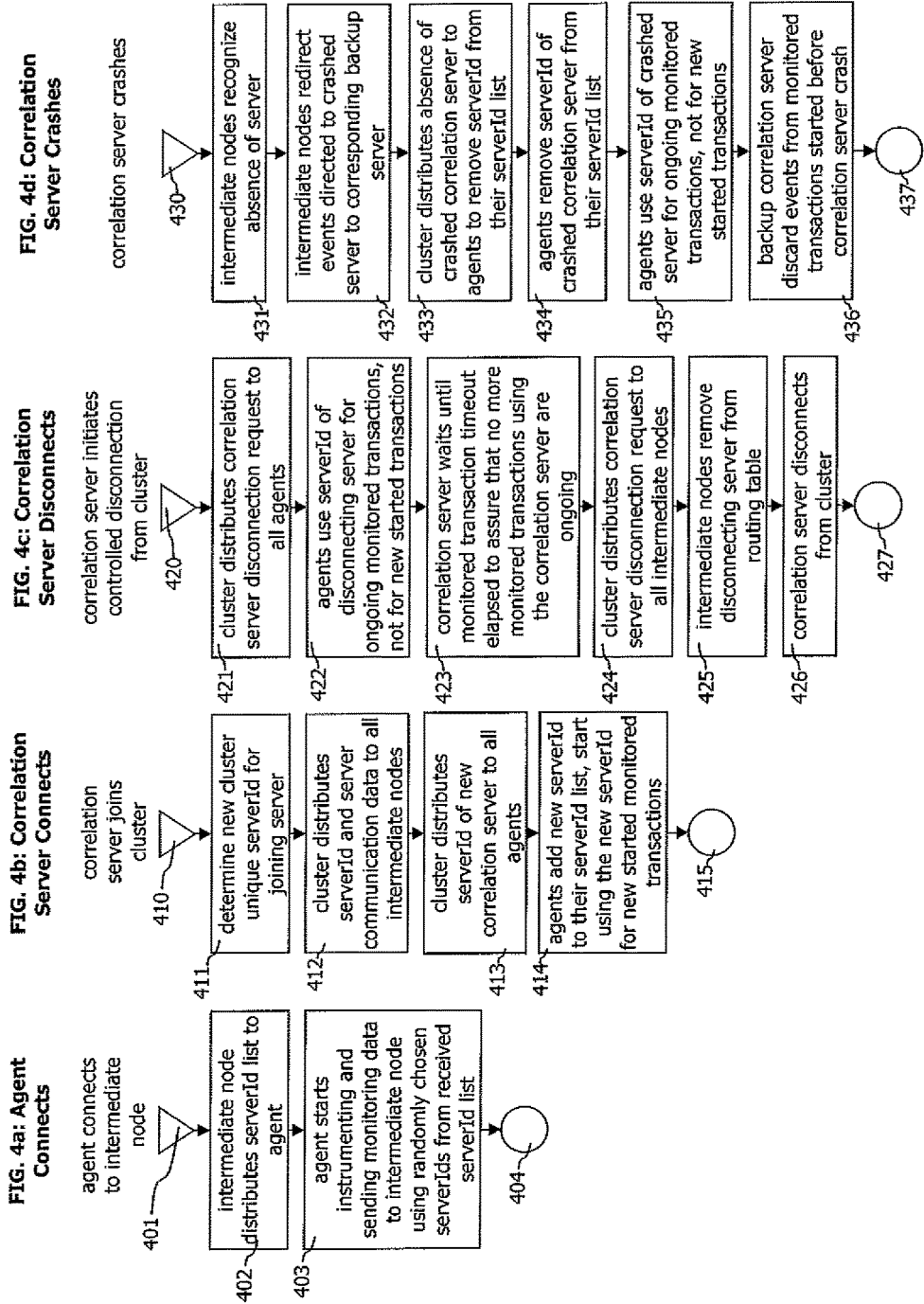

FIG 5: Processing of Trace Event Records
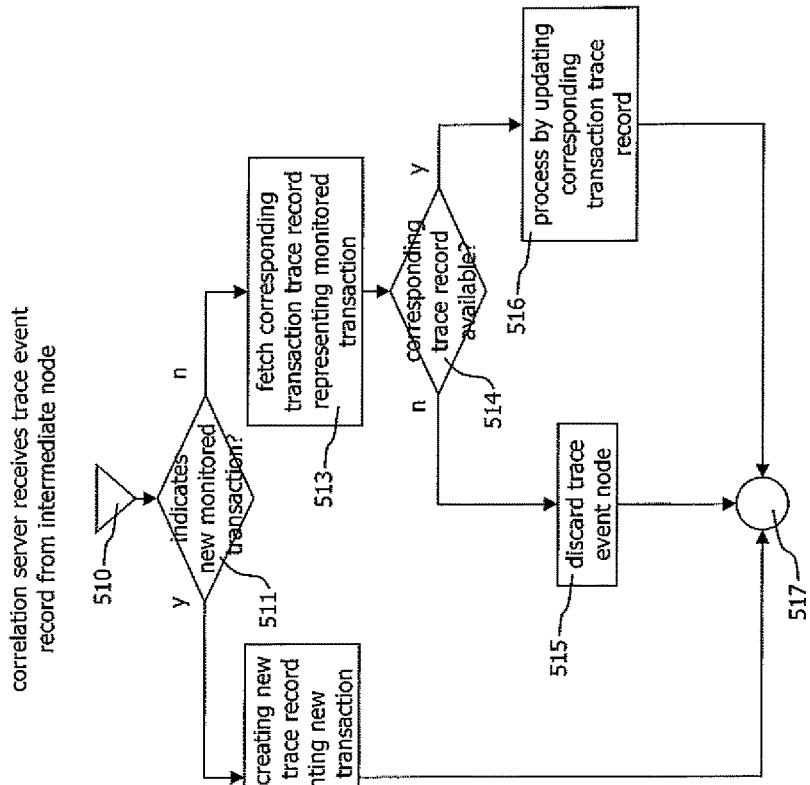
FIG. b: Trace Event Record Processing by Correlation Server
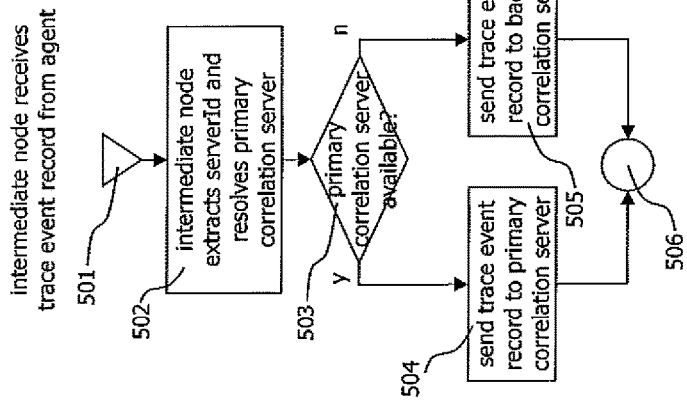
FIG. 5a: Trace Event Record Processing by Intermediate Node

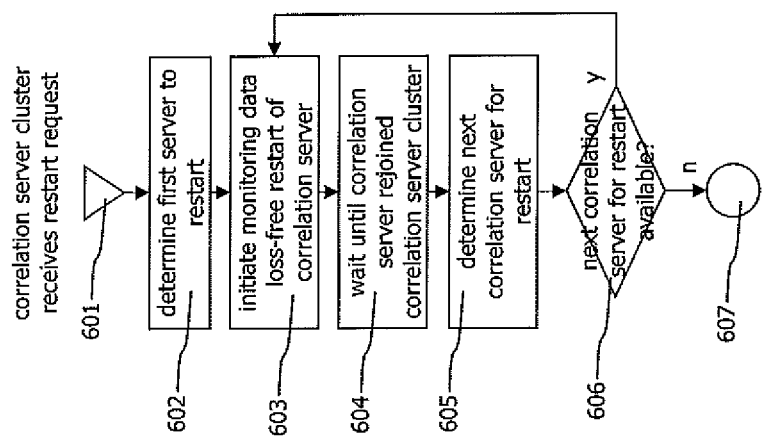
FIG 6: Controlled Restart of Correlation Server Cluster

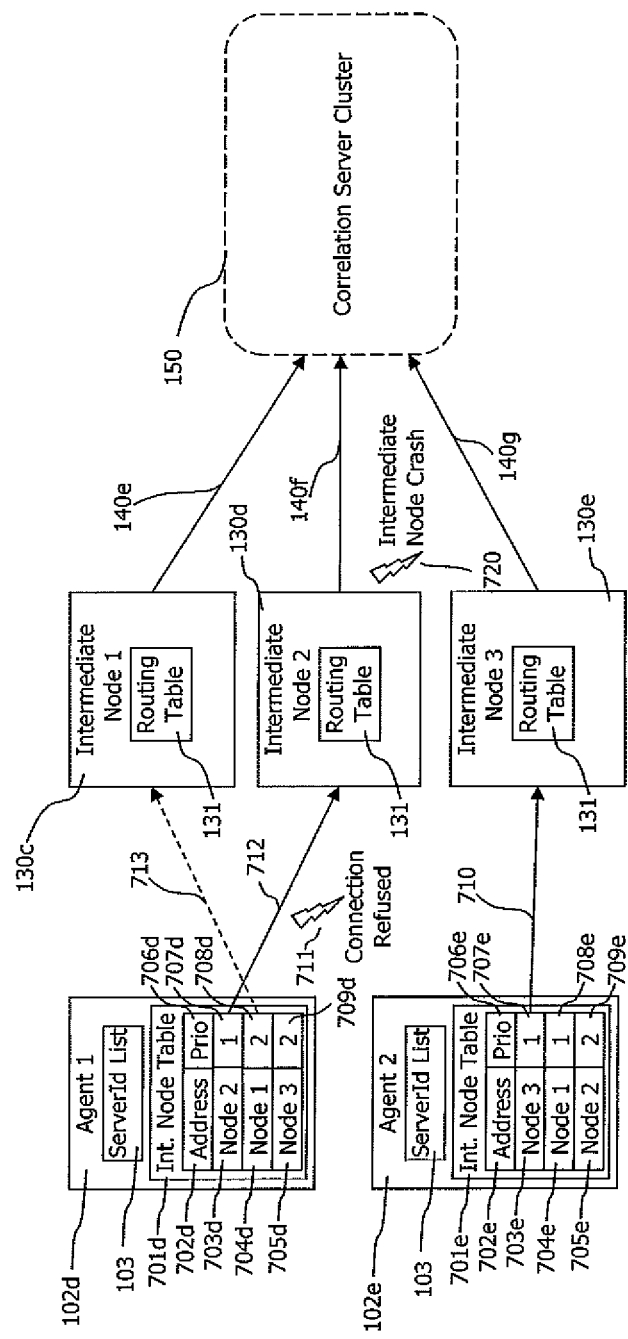
FIG 7: Intermediate Node Failover Resistant Architecture

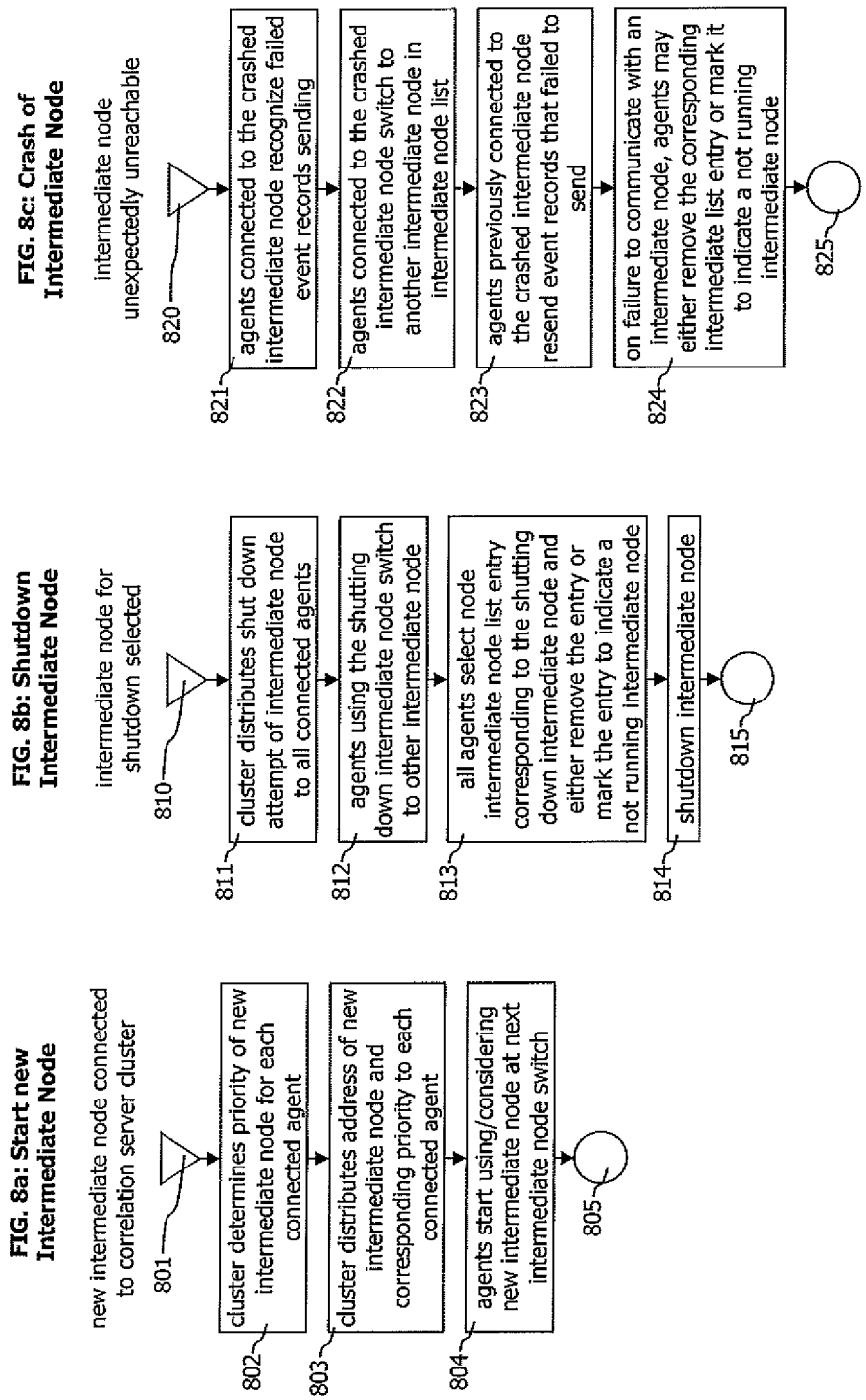

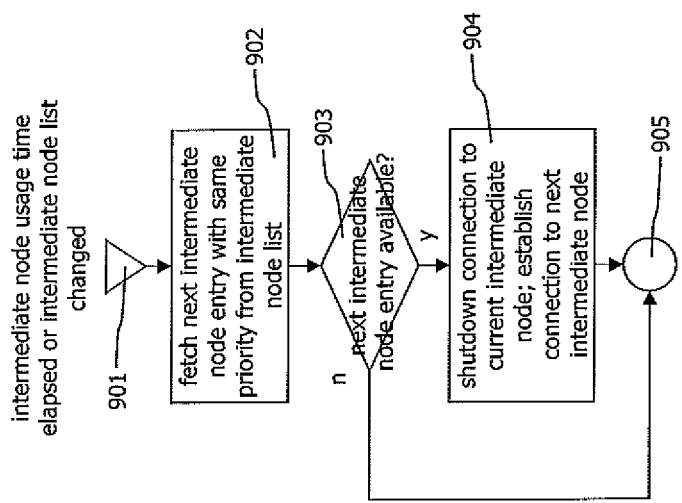

METHOD AND SYSTEM FOR CLUSTERED REAL-TIME CORRELATION OF TRACE DATA FRAGMENTS DESCRIBING DISTRIBUTED TRANSACTION EXECUTIONS

CROSS-REFERENCE TO RELATED APPLICATIONS

This application claims the benefit of U.S. Provisional Application No. 62/218,113, filed on Sep. 14, 2015. The entire disclosure of the above application is incorporated herein by reference.

FIELD

The present invention is directed to a system and method for clustered correlation of individual transaction trace data fragments provided by independent monitoring agents. More specifically, the disclosed system and method allows a distributed correlation of such individual transaction trace data without correlation related communication between correlation servers.

BACKGROUND

Monitoring systems capable to perform monitoring and tracing of individual distributed transaction and to provide data describing internal execution details, performance and behavior of each individual monitored transaction have gained wide popularity amongst application operators. The reason of this popularity is the fine grained level of information that is provided by those systems, which allows application operators to pinpoint the root causes of detected behavior or performance problems, even if they only affect a small number of monitored transactions.

Typically, such monitoring systems deploy agents to processes involved into the execution of monitored transactions. Those agents identify portions of distributed transactions executed on the process, capture execution details of those portions, like data describing individual method executions. To allow the identification and correlation of portions of distributed transactions performed by different threads on different processes or computer systems, the deployed agents also monitor incoming and outgoing communication performed by the processes they are deployed to, attach correlation data to outgoing communication data and read correlation data from incoming correlation data. This correlation data passed with communication data allows a correlation process to identify and correlate corresponding trace data describing communicating parts of a distributed transaction and allows the correlation process to reconstruct end-to-end transaction trace data describing the execution of the distributed transaction.

The agents create and send their transaction trace and monitoring data to a central correlation server operates a correlation process that analyses the transaction trace data fragments and combines them into individual end-to-end transaction traces.

As each agent runs separately and independently from each other agent, and they only use a portion of processing resources from the processes they are deployed to, there is no limiting factor for the number of monitored processes from the agent side. The central correlation server side, which has to receive and process all tracing data from connected agents quickly becomes a bottle neck. For larger application monitoring setups with a high number of monitored processes and with high transaction load, the processing and memory requirements of such a centralized correlation process quickly become unrealizable either in terms of financial resources to provide adequate hardware, or even due to technical impossibility to fulfill those hardware requirements.

Distributing the correlation load to a set of correlation servers that process the received transaction trace data in parallel, would remove this bottleneck and would allow such transaction monitoring systems to scale better by the number of monitored processes and transactions.

However, the kind of transaction trace data portions provided by the agents, that describes portions of transaction executions by one process that need to be correlated with corresponding other portions of transactions executed by other processes and provided by other agents, does not allow a static, agent based, segmentation of the correlation processing load without causing undesired cross communication between the correlation servers in the cluster. Theoretically, portions of individual distributed transactions may be executed on any monitored process. Consequently, trace data fragments describing those transaction portions may be provided by any agent. Therefore, transaction trace data fragments from all agents may potentially be required to create end-to-end transaction trace data. In a distributed correlation process executed by a set of correlation servers connected by a computer network and forming a correlation cluster, each correlation server only receives a subset of the transaction trace data fragments. As a consequence, correlation servers would need to communicate with other correlation servers to request missing trace data fragments, as transaction trace data fragments from one distributed transaction may be sent to different correlation servers. This causes undesired network communication between the correlation servers that slows down the correlation process and that also requires a high amount of network bandwidth. In the worst case, adding a correlation server to the cluster may exponentially increase the network bandwidth usage.

In case e.g. each agent would be assigned to a specific correlation server in the cluster, the agents would provide transaction trace data fragments of transaction portions executed on the process to which it is deployed to the correlation server they are connected to. To complete transaction trace data fragments received by one correlation server to form end-to-end transactions, the correlation server would constantly need to request corresponding transaction trace data fragments from its peer correlation servers in the cluster. This would result in large amount of network traffic between the correlation servers which would quickly become another bottleneck for the correlation process.

Consequently, there is a need in the art for a system and method that allows clustered correlation of transaction trace data received from independently operating agents that requires no or only a minimum of communications between the correlation servers forming the cluster.

This section provides background information related to the present disclosure which is not necessarily prior art.

SUMMARY

This section provides a general summary of the disclosure, and is not a comprehensive disclosure of its full scope or all of its features.

The present system and method consists in agents, deployed into processes to monitor transaction executions, and a set of correlation servers forming a correlation cluster. Each agent monitors parts of transaction executions performed by the process the agent is deployed to and reports created monitoring data, describing portions of individual transaction executions, in form of transaction trace data to correlation servers in a correlation server cluster. Each agent maintains a list of correlation server ids that contains an identifier for each server in the correlation cluster. In case an agent registers an incoming communication starting a new monitored transaction, the agent randomly selects one correlation server and sends all tracing and correlation data corresponding to the new transaction to the selected correlation server. In case an agent detects an outgoing communication performed by a monitored transaction, the agent attaches, next to correlation data allowing to identify matching transaction trace data fragments, an identifier for the selected correlation server to the communication data. In case an agent registers an incoming communication being part of an already monitored transaction, the agent reads, next to correlation data allowing to identify matching parent transaction trace data fragments, an identifier for the selected correlation server from the communication data. The received correlation server identifier is used to identify the correlation server to which the transaction data fragments corresponding to the process local execution of the monitored transaction are sent. This process of selecting a correlation server at the agent that recognizes the start of a transaction and then forwarding and using the result of this selection to all other agents that are involved in the processing of the monitored transaction assures that all transaction trace data for one transaction is received by one transaction server, regardless of the number of agents that are involved in the processing of the transaction.

In some embodiments of the disclosed technology intermediate nodes may be deploy, to which agents connect and which perform a mapping between identifiers of correlation servers and network connections to the identified correlation servers. In such embodiments, the agent may send tracing data tagged with a correlation server identifier to an intermediate node and the intermediate node may resolve the address of the corresponding correlation sever and forward the received tracing data to the resolved correlation sever.

In some variants of those embodiments, intermediate nodes may detect the unavailability of a resolved correlation server and may in this case determine, based on the received sever identifier, a backup correlation server and send the received correlation data to the backup correlation server instead of the resolved but unavailable correlation server identified by the server identifier.

In other embodiments of the disclosed technology, each agent may maintain a list of available intermediate nodes and may in case the currently used intermediate node gets unavailable, switch to another intermediate node.

In some variants of those other embodiments, agents may cyclically change the used intermediate node and rotate through all available intermediate nodes. This assures that in case a new intermediate node is deployed to the system and its existence is notified to all connected agents, the new intermediate node automatically become used by the agents.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a deployment of a monitoring system for clustered transaction trace correlation with a set of monitored processes containing injected agents, communicating with a correlation server cluster consisting in a set of correlation servers via intermediate nodes.

FIGS. 2A-B conceptually describe data records to store and send portions of transaction trace data describing process or thread local execution parts of distributed transactions from agents to correlation servers, and data records to transfer correlation data to identify corresponding portions of transaction trace data between processes or threads executing different parts of a distributed transaction.

FIG. 3 provides a flowchart that describes the execution of a sensor instrumented to a method that is executed by a monitored transaction. The sensor creates next to transaction performance and functionality measurement data, correlation data that allows to identify corresponding transaction trace data fragments describing one distributed transaction and that allows to specify a target correlation server for all transaction trace data fragments of a monitored distributed transaction.

FIGS. 4A-D show flowcharts that conceptually describe the distribution and update of a list of server identifiers used to identify target correlation servers for transaction data fragments on events like the connection of a new agent, or a new correlation server, the controlled shutdown of correlation server or the unexpected crash of a correlation server.

FIGS. 5A-B contain flowcharts that describe the processing of transaction trace data fragments by intermediate nodes and by correlation servers.

FIG. 6 describes the process of a transaction trace data loss-free restart of a correlation server.

FIG. 7 visually described the handling of an intermediate node crash by agents trying to communicate via the crashed intermediate node.

FIGS. 8A-C show flow charts describing the processing of events that are changing the availability of intermediate nodes, like the connection of an intermediate node to a cluster, its controlled shutdown or unexpected crash.

FIG. 9 shows the process performed by agents to cyclically switch through available intermediate nodes.

Corresponding reference numerals indicate corresponding parts throughout the several views of the drawings.

DETAILED DESCRIPTION

Example embodiments will now be described more fully with reference to the accompanying drawings.

The disclosed system and method monitors distributed transactions, executed by multiple, distributed application processes using agents deployed to the application process. The deployed agents generate transaction trace data describing portions of individual transactions executed by a specific thread of a specific process. The transaction trace data fragments are generated in a way that supports distributed correlation and combination of transaction trace data into end-to-end transaction trace data. The correlation of the transaction trace data fragments is performed by a set of correlation servers that form a correlation server cluster. No communication between different correlation servers of the clusters is required to process and correlate received transaction trace data fragments.

The agents deployed to the application processes may monitor incoming communication messages and distinguish between the situations when an incoming communication message starts a new monitored transaction and when it is part of an already monitored transaction.

In case a new monitored transaction is stared, the agent may select a target correlation server out of the correlation server cluster and send all local trace data regarding the new transaction to this correlation server. Data allowing to identify the selected correlation server is attached to the execution context (i.e. thread local storage) of the monitored transaction and added to all outgoing communication messages sent by the monitored transaction.

In case an incoming communication is part of an already monitored transaction, the agent reads the data to identify the correlation server for the transaction form the communication data and sends all local trace data regarding the transaction to this server.

The determination of a correlation server on the agent side at the start of a new monitored transaction and then using the same correlation server for the monitored transaction, regardless which agent is involved into the transaction execution guarantees that all transaction trace data describing a monitored transaction is received and processed by one correlation server. As the transaction trace data fragments contain all data required to correlate and combine them into an end-to-end transaction trace, the receiving correlation server also needs no data from its peer correlation servers in the correlation server cluster to perform the correlation.

To increase the robustness of the monitoring system against the unexpected unavailability of a correlation server, e.g. due to a crash of a correlation server, the monitoring system may deploy and use a set of intermediate nodes which act as proxies between the agents and the correlation servers. In case of a crashed correlation server, the intermediate nodes may route transaction trace data dedicated to the crashed correlation server to a backup correlation server, until the monitoring system has notified the absence of the crashed correlation server to all connected agents and the agents stop sending transaction trace data to the crashed correlation server.

To further improve the robustness of the monitoring system, each agent may be capable to connect to multiple intermediate nodes to switch the intermediate node connection in case an intermediate node crashes.

Referring now to FIG. 1 which depicts a block diagram of a monitoring system deployment consisting in a set of agents 102a to 102c, deployed to monitored processes 101a to 101c. Each agent is connected to one intermediate node 130a and 130b. The intermediate nodes forward transaction trace data received by the agents to the correlation servers 151a to 151c of the correlation server cluster. Each transaction trace data fragment contains a server id 104 to 106 set by the agent that created the transaction data fragment. An intermediate node receiving a transaction data fragment uses the server id of the transaction data fragment and the routing table to resolve the address 137 to 139 of a correlation server 151a to 151c. The intermediate nodes forward received transaction data fragments to the resolved correlation server.

The snapshot depicted at FIG. 1 shows 4 monitored distributed transactions T1 to T4 that are currently executed by the system. Transaction T1 enters 110a the monitored system via monitored process 1 101a and is recognized there by agent 1 102a. On detection of new transaction T1 110a, agent 1 102a accesses its server id list 103 to randomly select a server id out of the available server ids 104 to 106 for the new transaction T1. In this case, server id S1 104 is selected. Transaction trace data describing the execution of transaction T1 on monitored process 1 101a is sent to intermediate node 1 130a to which agent 1 is currently connected. The transaction trace data is sent 121 in form of a sequence of trace event records 201 describing method entries, method exits, thread switches etc. performed by transaction T1 on monitored process 1. On incoming trace event records 201, the intermediate node 1 130a uses its routing table 131 to determine the corresponding server address. For events describing T1, the server id is S1 and the corresponding routing table entry 133 identifies a server address srv1 137 pointing to correlation server srv1 151a of the correlation server cluster 150. Correlation serve srv1 151a receives the trace event records describing the execution of T1 on monitored process 1 and creates corresponding transaction trace data $T1_{P1}$ 151a.

During execution of T1 on process 1 101a, T1 performs a call 111a to monitored process 2 101b. Agent 1 102a detects the outgoing call performed by T1 and attaches correlation data allowing to identify the portion of T1 that performed the call and data to identify the selected correlation server id S1 to the data sent with the outgoing call. The correlation data and the correlation server identification data may be attached to the call data in form of a correlation data transfer record 210.

Agent 2 102b detects the incoming call performed by T1, extracts correlation data and server id data from the call data and starts monitoring the execution of the portion of T1 that is performed on monitored process 2 110b. The trace data created by agent 2 102b to describe the portion of T1 performed on monitored process 2 101b is tagged with correlation data allowing to identify the portion of T1 executed on process 1 101a causing the execution of the portion of the monitored transaction on process 2 101b, and with the correlation server id received with the incoming call data from process 1. The trace data 123 is sent from agent 2 to intermediate node 1 130a to which agent 2 is currently connected. Intermediate node 1 uses its routing table 132 to identify the corresponding correlation serer srv1 151a for the received server id S1 and sends the trace data in form of trace event records 201 to correlation server srv1 151a. Correlation sever srv1 receives and processes the trace data describing the processing of T1 on process 2 and creates corresponding transaction trace data 152b. Transaction trace data 152a describing processing of T1 on process 1 and transaction trace data 152b describing processing of T1 on process 2 is linked to form end-to-end transaction data describing the processing of T1 in its entirety.

Transactions T2 110b and T3 110c enter the monitored system via process 2 101b and are recognized by agent 2 102b deployed to process 2. The agent randomly selects a correlation server id for both transactions and selects S2 for both transactions. Portions of transaction trace data 124 describing T2 are sent to intermediate node 1 130a, which forwards those transaction trace data fragments to correlation server srv2 according to the server id received with the transaction trace data. During execution of T2 on process 2 101b and before the execution of T3 starts, agent 2 102b deployed to process 2 101b switches from intermediate node 1 130a to intermediate node 2 130b. Such a switch may e.g. be performed to execute an intermediate node usage policy of the monitoring system specifying that agents should cyclically switch the intermediate node connection.

After the intermediate node switch, agent 2 102b sends transaction trace data 125 and 126 describing T2 and T3 to intermediate node 2, which forwards 140b and 140c the received transaction trace data to correlation server srv2 identified by the server id S2 received with the transaction trace data.

Correlation server srv2 processes the transaction trace data describing the execution of T2 and T3 on process 2 which it receives via intermediate node 1 and intermediate node 2 to create portions of end-to-end transaction trace data $T2_{P2}$ 152c describing the execution of T2 on process 2 and $T3_{P2}$ 152g describing the execution of T3 on process 2. Transaction T2 performs a call to process 1 101a and agent 102a deployed to process 1 detects the incoming call, extracts data from the correlation data transfer record 210 attached by agent 102b form the received call data and creates transaction trace data describing the processing of T2 on process 1. The created transaction trace data is forwarded to intermediate node 1 130a which forwards it to correlation server srv2 151b according to the server id received with the correlation data transfer record 210. Correlation server srv2 processes the receiver transaction trace data to create end-to-end transaction trace data 152d describing the processing of T2 on process 1. The execution of T1 on process 1 performs a call back to process 2, which is detected by agent 1 102a. The detected request is tagged with a correlation data transfer record 210. Agent 2 on process 2 detects the incoming call performed from process 1 to execute transaction T2, extracts correlation data and correlation server id data from the received correlation data transfer record 210 and monitors the execution of the portion of T2 executed on process 2 that is caused by the call from process 1. The created transaction trace data is sent to intermediate node 2 130b which routes the received transaction trace data to correlation server srv2, which processes it and creates end-to-end transaction trace data $T2_{P2}$ 152e describing the second portion of T2 performed by process 2.

Execution of T2 may start on process 2, and during execution of T2 perform a synchronous call to process 1 and the thread execution T2 on process 1 may wait for the result of the call. The processing of T2 on process 1 may in turn perform a call to process 2 which is processed by process 2 in another thread. At this point in time, processing of transaction T2 on process 2 is performed concurrently in two threads. The monitoring system identifies and reports this situation correctly by creating $T2_{P2}$ 152c describing the initial processing of T2 and $T2_{P2}$ 152e describing the secondary processing of T2 on process 2 caused by the call from process 1.

The secondary processing of T2 on process 2 causes a call to process 3, which is recognized and monitored by agent 3 102c deployed to process 3. All transaction trace data corresponding to transaction T2 is routed by intermediate node 1 130a and intermediate node 2 130b to correlation server srv2 151b, which creates end-to-end transaction trace data describing the sequential processing of T2 starting on process 2 $T2_{P2}$ 152c, continued on process 1 $T2_{P1}$ 152d, on process 2 $T2_{P2}$ 152e and on process 3 $T2_{P3}$ 152f.

Transaction T3 performs a call from process 2 to process 3, which is recognized by agents 2 102b and 3 102c which transfer correlation data transfer record 210 from process 2 to process 3. The transferred correlation data transfer record is used to create transaction trace data describing the processing of T3 on process 3 101c caused by a call from process 2. All transaction trace data describing T3 is forwarded to correlation server srv2 151b which creates end-to-end transaction trace data consisting in $T3_{P2}$ 152g and $T3_{P3}$ 152h describing the execution of transaction T3 by the processes 2 101b and 3 101c.

Transaction T4 enters the monitored system via a request 110d on monitored process 3 101c. Agent 3 102c deployed to process 3 detects the incoming call, detects that the incoming call initiates the execution of a new transaction T4 and in response randomly selects correlation server id S3 to be added to all transaction trace data corresponding to transaction T4. Execution of T4 on process 3 101c is monitored and reported by agent 3 102c in form of transaction event records 201 with a correlation server id 205 set to S3. Those transaction event records are sent to intermediate node 2 130b which forwards them to correlation server srv3 151c. During execution, T4 performs a call 111d to process 2 101b, which is recognized by the agents 102c and 102b deployed to process 3 and process 2. Agents 102c and 102b transfer a correlation data transfer record 210 with the call data sent from process 3 to process 2 to execute T4. The agent deployed on process 2 101b monitors the process local execution of T4 and sends corresponding trace data to intermediate node 2 130b. The intermediate node forwards all trance data corresponding to T4 to correlation serve srv3 151c, which creates end-to-end trace data in form of $T4_{P3}$ and $T4_{P2}$ describing the execution of T4.

The scenario described in FIG. 1 shows the execution and tracing of monitored transactions on the level of process communications to more clearly show the working and results of the disclosed technology. However, monitoring and tracing of transaction may be performed on a per thread granularity, as e.g. described in U.S. Pat. No. 8,234,631 "Method and System for Tracing Individual Transactions at the Granularity Level of Method Calls Throughout Distributed Heterogeneous Applications without Source Code Modification" by Greifeneder et al., which is incorporated herein by reference in its entirety. The concepts disclosed here, like determining a correlation server on start of a monitored transaction and sending all subsequent transaction trace data to this correlation server also may be applied to the concepts described in U.S. Pat. No. 8,234,631.

Referring now to FIG. 2 which depicts data records to transfer transaction trace data fragments from agents to correlation servers and to transfer correlation data between parts of a distributed transaction executed by different threads that may run on different processes. FIG. 2a shows a trace event record 201, which is created by an agent 102 to report an event that occurred on a monitored transaction, like start or end of a method execution, spawning of a child thread or the initialization of a communication with another thread, either on the same process or on another process. A thread event record 201 may contain but is not limited to parent identification data 202 that identifies the thread execution that triggered the thread execution described by the trace event record, local identification data 203 that identifies the thread execution described by the trace event record, thread internal correlation data 204 describing the detailed state of the thread execution in form of e.g. the name of the currently executed method, method call sequence and method call nesting level. A trace event record 201 may further contain a correlation server id 205 that may be used to identify the correlation server 151 out of a set of correlation servers forming a correlation sever cluster 150 on which the transaction event record 201 should be processed, and measurement data consisting in e.g. the start time or end time of a method execution, number of exceptions caught and processed by a method or the values of parameters or the return value of an executed method or other measurement data describing the performance or behavior of a monitored method execution.

FIG. 2b depicts a correlation data transfer record 210 that is used to transfer correlation data and correlation server identification data between parent and child thread executions of a monitored transaction. A correlation data transfer record 210 may contain but is not limited to a parent identification data section that identifies a portion of a monitored transaction executed in a specific thread, by a specific process on a specific computer system, that initiates a communication with another thread, possible running on another process that may be executed on another computer system and a correlation server id 212 that identifies the correlation server which processes the trace event records describing the portion of the monitored transaction that initiated the communication and which should be used to process the trace event records describing the portion of the monitored transaction that receives and processes the communication data.

Parent identification data 202 and local identification data 203 of a trace event record 201 and parent identification data 211 of a correlation data transfer record identify a specific execution of a specific thread, performed by a specific process on a specific computer system that is part of a monitored transaction. Parent identification data and local identification data identify a specific execution of a specific monitored transaction by a specific thread. They differ from thread identifiers that identify a specific thread. In architectures using thread pools to reduce resource utilization by reusing threads, one thread with a specific thread identifier may execute portions of different monitored transactions, each of this portions having its own parent or local identification data.

Referring now to FIG. 3 which shows a flow chart that conceptually describes the execution of a sensor instrumented into the code methods executed by monitored processes 101 during the execution of monitored transactions 110. Sensors may notify start and end of the execution of instrumented methods, they may capture and report values of method parameters and return values and they may detect and report thrown and caught exceptions or other indicators for the performance of behavior of a monitored method execution.

Sensors may be placed manually, by adding corresponding calls to the source code of the application and recompiling it, or they may be placed on the fly into bytecode or other intermediate code of a monitored application as it gets loaded, following e.g. the teachings of U.S. Pat. No. 8,464,225 "Method and System for Adaptive Generic Code Instrumentation Using Run-Time or Load-Time Generated Inheritance Information for Diagnosis and Monitoring Application Performance and Failure" which is included herein by reference in its entirety.

The flowchart of FIG. 3 describes the processing of a sensor that notifies the start of the execution of an instrumented method and starts with step 301 when the instrumented method is called. Following decision step 302 determines if the detected method execution indicates a new thread execution performed by a monitored transaction. This may e.g. be performed by storing data indicating the nested call depth of monitored transactions in a thread local storage of the currently executed thread. In case this nested call depth storage is not set or if it indicates a call depth of 0, then a new thread entry is detected. Sensors monitoring start and end of method executions may cooperate to maintain the nesting call depth indicator, by incrementing it for a method entry and decrementing it for a method exit. This follows the teachings of U.S. Pat. No. 8,234,631, for details please see there.

In case step 302 detects a thread entry, step 303 checks if parent identification data for the new started thread execution of a monitored transaction is available. Parent identification data is only available if the parent thread execution causing the currently monitored thread execution was also monitored by the monitoring system. Only in this case, a sensor may have detected the outgoing communication causing the current thread execution and may have attached a correlation data transfer record 210 containing parent identification data 211 to the outgoing communication data. The currently executing sensor may analyze received communication data to verify the existence of a correlation data transfer record 210 in the received communication data. In case no correlation data transfer record is found in the received communication data, then the parent thread execution was not monitored and the current thread execution represents the start of a new monitored transaction.

In case no correlation data transfer record is available, step 304 is executed which randomly chooses a server id (e.g. 104 to 106) from the server list 103 of the agent. If otherwise a correlation data transfer record is found in the incoming communication data, step 305 is executed which extracts parent id data 211 and correlation server identification data 212 from the received correlation data transfer record.

In some embodiments, the server identification list may in addition to the identification data of correlation servers of the correlation cluster, contain data describing the resources available for each correlation server, e.g. in terms of available system memory or available CPUs. In those variants, step 304 may bias the random selection of a correlation server identifier to more often select those correlation serves with higher amount of available system memory or CPUs. In yet other embodiments, data describing the average transaction load of each correlation server may be distributed to the agents, and step 304 may consider both available resources and average transaction load to bias the random selection of the correlation server.

After either step 304 or 305, step 306 is executed which creates data that identifies the portion of the monitored transaction that is executed locally by the current thread. This data may contain an identifier identifying the current portion of a monitored transaction executed by the current process, an identifier for the current process and an identifier for the computer system running the current process.

Following step 307 stores the created or received correlation server identification data 212 and the created local identification data in thread context data, in a way that it is accessible for subsequent sensor executions performed by the current thread.

Step 308 afterwards creates a trace event record that indicates the start of a new monitored thread execution as part of a monitored transaction, and initializes its local identification data 203 with the local identification data created in step 306, its thread internal correlation data to indicate the first execution of an instrumented method by the monitored thread execution, its correlation server id 205 with the correlation server identification data either determined in step 304 or extracted from a correlation data transfer record 210 received with incoming communication data in step 305 and sets its measurement data with data extracted from the current thread execution context, like the name of the current thread, its priority, the name of the instrumented method which is starting to execute or values of method parameters. In case of available parent identification data, as received with the communication data of the incoming communication that started the thread execution, the received parent identification data is set to the parent identification data 202 of the created trace event record, indicating that the new monitored thread execution was triggered by another monitored thread execution that is identified by the set parent identification data. Otherwise the parent identification data 202 is not set which indicates that the new monitored thread execution starts a new monitored transaction. Following step 309 sends the created trace event record to the intermediate node 130 that is currently used by the agent 102. The process then ends with step 310.

In case decision step 302 determines that the current execution of an instrumented method is not the first by the current thread execution, indicating that no new monitored thread execution is started, but the current method execution is part of an already ongoing monitored thread execution, the process continues with step 311, which determines if the currently executed method is dedicated to trigger the start of a new thread execution, or to communicate with another thread. The new or other thread may be started or may be executed on another process that may run on another computer system than the process executing the current thread. Such thread starting methods may include but are not limited to methods that spawn new threads on the local process or methods that perform remote method invocation requests, HTTP or other types of requests to a request handling server, or methods that send messages to a messaging system. In case step 311 detects that such a method is currently being executed, step 312 is executed which creates a correlation data transfer record 210, sets its parent identification data 211 to the local identification data created in step 306 and stored in thread local context data available for subsequent sensor executions by the thread in step 307 and sets its correlation server identification data 212 to the server identification data that was stored in the thread context of the current thread by step 307. The created correlation data transfer record is attached to the message that is sent to start a new thread or start a communication with another thread. If the receiving thread is executed by a monitored process, a sensor is instrumented to the receiving method which executes the process described in FIG. 3 for the receiving thread.

After step 312, or in case step 311 determines that no thread starting method currently is executed, step 313 is executed which creates a trace event record 201 indicating an execution of an instrumented method by an already monitored thread execution. The local identification data 203 is set to the local identification data stored in the thread context data, the thread internal correlation data 204 is set to indicate thread internal processing and contains data to identify the call sequence and call nesting level of the current method execution relatively to previously started executions of instrumented methods on the current thread to execute a portion of the monitored transaction on the current thread. The correlation server identification data 205 is set to the correlation server identification data stored in the thread local context data and the measurement data 206 is set to data describing the current method execution. Following step 309 sends the created trace event record to the currently used intermediate node and the process ends afterwards with step 310.

Referring now to FIG. 4 which depicts flowcharts of various processes that are executed by components of the monitoring system to initialize and update the server identification list 103 of each agent 102 of the monitoring system on changes of the correlation cluster 150.

FIG. 4a describes the process that initializes the server list 103 of an agent 102 that connects to an intermediate node 130 of the monitoring system. The process starts with step 401 when the agent connects to an intermediate node 130. In subsequent step 402, the intermediate node 130 distributes the current server identification list to the connecting agent. The current server identification list contains server identification data of all correlation servers that are currently available in the correlation cluster to receive and process trace event records 201. The intermediate node 130 may cyclically poll cluster configuration data which contains data to create and update the current server identification list. Step 402 may either be triggered by the intermediate node on connection of a new agent, or it may be triggered by the agent after connection during a first polling of agent configuration data which also contains the server identifier list.

Afterwards the new connected agent 102 executes step 403, in which the agent starts to instrument code of the application it is deployed to, starts to monitor portions of monitored transaction and starts to use the distributed correlation server identification list to randomly choose a correlation server for new monitored transactions detected by the new connected agent. The process then ends with step 404.

The update of the server identification list on all agents on the event of a new correlation server 151 joining the correlation server cluster is described in FIG. 4b.

The process starts with step 410 when a new correlation server joins the correlation server cluster 150. Subsequent step 411 integrates the new correlations server into the correlation server cluster by determining a correlation server identifier for the new correlation server that is unique within the cluster. On determination of the correlation server identifier for the new correlation server, cluster configuration data may be updated to reflect the added correlation server and its server identifier. The cluster configuration data may be accessible to all connected intermediate nodes. Following step 412 may be implemented by a cyclic polling process performed by all intermediate nodes that cyclically checks for updates of the correlation cluster configuration data. On an update, the cyclic polling request loads and uses the updated correlation cluster configuration data. On an update of the correlation cluster configuration data the connected intermediate nodes may update their routing table 131 according to the new cluster configuration data. In case of a new correlation server that is added to the correlation cluster 150, the connected intermediate nodes may add a new entry containing the server identifier 132 and the address 136 of the new joined correlation server to their routing table.

Subsequent step 413 distributes the server identification data of the new joined correlation server to all agents connected to intermediate nodes that are connected to the correlation cluster. The distribution of the server identification data of the new joined correlation server may be implemented by a cyclic request issued by all agents that cyclically polls for cluster configuration updates. The agents may send their cyclic poll request either to the intermediate node they are currently using, or directly to the correlation cluster. The intermediate node may either directly respond to the request for a configuration change using a locally stored copy of the cluster configuration or it may forward the request to the correlation cluster. In each case, the agent may get a response containing either complete or partial cluster configuration data that contains the server identification data of all correlation servers in the cluster including the identification data of the new joined correlation server.

Afterwards, with step 414, the agents update their server identifier list 103 to include the server identification data of the new correlation server and start to use the new correlation server identification data as target correlation server for new started monitored transactions. The process then ends with step 415.

The processing performed by components of the monitoring system on the controlled shutdown of a correlation server of the correlation server cluster is shown in FIG. 4c. The process starts with step 420 when a correlation server 151 starts a controlled disconnect from the correlation server cluster 150. Following step 421 distributes the request of correlation server to disconnect form the correlation server cluster to all connected agents. This may be implemented by sending agents configuration data that no longer contains the server identification data for the disconnecting server as response for their cyclic polling request for configuration data updates. Consequently, the connected agents stop using the disconnecting correlation server for new starting monitored transactions with step 422.

Afterwards, the disconnecting correlation server waits in step 423 until the timeout period indicating the maximum duration of a monitored transaction is elapsed. After this period, all monitored transaction that were started before the agents received the disconnection request of the correlation server are terminated, and no more trace event records 201 from any connected agent that are directed to the disconnecting correlation server can be expected.

In subsequent step 424, the cluster distributes the disconnection request of the correlation server to all intermediate nodes of the monitoring system, which in following step 425 remove the entry corresponding to the disconnecting correlation server from their routing table 131. The distribution of the disconnection request in step 424 may also be performed by sending the connected intermediate nodes cluster configuration data that no longer contains data corresponding to the disconnecting correlation server as response to their cyclic request for configuration updates.

Afterwards, the correlation server 151 that requested to be disconnected from the correlation cluster may be removed from the correlation cluster and may be shut down in step 426. The process then ends in step 427.

The reaction of components of the monitoring system on an unexpected crash of a correlation server 151 of the correlation server cluster 150 is depicted in FIG. 4d. The process starts with step 430 when a correlation server of the correlation server cluster crashes and is no longer responsive for requests to process trace event records 201. In subsequent step 431, intermediate nodes recognize that the crashed correlation server is no longer available and with step 432 the intermediate nodes start to redirect events directed to the crashed correlation server to the backup correlation server of the crashed correlation server. In some embodiments, the routing tables 131 may be sorted according to the correlation server identification data 132, and the corresponding backup server for a crashed correlation server would be the next available correlation server on the routing table 131. Various policies may be applied by intermediate nodes to determine a backup server for a crashed server, as long as all intermediate nodes use the same policy and as long as the policy creates the same result on all intermediate nodes.

In following step 433 the remaining servers of the correlation cluster process the crash of the correlation server and may send agents configuration data that longer contain the server identification data for the crashed correlation server as responds for their cyclic configuration update requests.

With following step 434, the agents remove the server identification data for the crashed correlation server from their server identification data list 103, and with subsequent step 435 stop using the crashed correlation server as target correlation server for new started monitored transactions. The agents may still use the crashed correlation server for tracing data of already ongoing transactions, but the intermediate nodes may forward this transaction trace data to the backup correlation server.

As described in step 436, the backup correlation server may discard trace event records originally directed to the crashed correlation server that correspond to transactions started before the crash of the correlation server, but process trace event records originally directed to the crashed correlation server that correspond to transactions started after the crash of the correlation server. The intermediate nodes may remove the entry of the routing table corresponding to the crashed correlation server after all agents removed the server identification data of the crashed correlation data and after in addition the transaction time out period is elapsed. Afterwards, the process ends with step 437.

The processing of trace event records 201 by intermediate nodes and correlation servers is described in FIG. 5.

The processing of received trace event records 201 by intermediate nodes 130 is described in FIG. 5b. The process starts with step 501 when an intermediate node 130 receives a trace event node 201 from an agent 102. In subsequent step 502, the intermediate node 130 extracts the server identification data 205 from the received trace event record, fetches the entry with the matching server identification data 132 from its routing table 131 and resolves the address data of the target correlation server for the received trace event node 201. Following step 503 determines if the target correlation server is available and in case it is available, sends the received trace event record to the target correlation server in step 504. In case the target correlation server is not available, the intermediate node determines the backup correlation server for the original target correlation server and sends the received trace event node 201 to the backup correlation server. In both cases, the process afterwards ends with step 506. In case the selected backup correlation server is also not available, the backup server of the selected backup server may be selected until a backup server is found that is available.

The processing of receives trace data records to form end-to-end transaction trace data describing distributed monitored transactions by a correlation server is depicted in FIG. 5b. The process starts with step 510 when a correlation server receives a trace event node 201. Subsequent step 511 checks if the received trace event record indicates the start of a new monitored transaction. A trace event record indicates the start of a new monitored transaction when it indicates the start of a new monitored thread execution and its parent identification data 202 is not set. In case a new monitored transaction is indicated, the process continues with step 512 which creates a new end-to-end transaction trace record representing the new monitored transaction. The created end-to-end transaction trace record may be stored in a transaction repository of the correlation server. The process afterwards ends with step 517.

In case step 511 determines that the received trace event record does not indicate a new monitored transaction, but provides trace data notifying an update to an already ongoing monitored transaction, the process continues with step 513, which fetches the end-to-end transaction trace record corresponding to the ongoing monitored transaction from the transaction repository of the correlation server. In case such an end-to-end transaction trace record exists, step 516 is executed which updates the fetched end-to-end transaction trace record to reflect the transaction execution update notified by the received trace event record. In case no such end-to-end transaction trace record exists, step 515 is executed which discards the received trace event record, as the monitored transaction it belongs to is not known by the receiving correlation server. In both cases, the process ends with step 517.

It should be noted that the processing of trace event records by a correlation server is as depicted in FIG. 5b is simplified and only shows concepts required for the understanding of the current disclosure. For example, trace data record describing different parts of a monitored transaction that are executed on different processes and reported on by different agents, may arrive at the correlation server in arbitrary order. It is possible that trace data describing a portion of a distributed transaction executed by a child thread arrives at the correlation server before the transaction trace data describing the portion of the distributed transaction executed in the parent thread that spawned the child thread. A correct processing of trace event record must consider this arbitrary sequence of received trace data form different agents. The correlation processing described in U.S. Pat. No. 8,234,631 considers this and other aspects required for correct processing of transaction trace data describing distributed transactions. Please refer to this document for a more detailed description of the correlation process.

Referring now to FIG. 6 which depicts a flowchart of a process that may be performed for a controlled restart of a correlation server cluster without loss of transaction trace data. A restarts of the correlation server cluster consists in a controlled, sequential restart of all correlation servers of the cluster. This process may e.g. be performed to install a software update on the correlation servers of the cluster.

The process starts with step 601 when the correlation server cluster receives a restart request. Subsequent step 602 determines the first server which should be restarted. The correlation servers may e.g. be sorted according to their server identification data and the first server to be restarted may be the server with the lexically or numerically lowest server identification data.

Following step 603 initiates a monitoring and tracing data loss free restart of the selected correlation server. Step 603 may first execute the process described in FIG. 4c to perform a loss free shutdown of the correlation server, then perform the action which required the correlation server restart, like a software update of the correlation server, and then execute the process described in FIG. 4b to start the updated correlation server again and join it to the correlation server cluster.

The process waits in step 604 until the restarted correlation server has joined the cluster again and afterwards executes step 605 which determines the next correlation server to restart. This may be the correlation server with the next lexically or numerically higher server identification data. In case such a correlation server is available, the process continues with step 603 to restart the next correlation server. Otherwise, all correlation servers of the cluster are already restarted and the process terminates with step 607.

The cluster restarting process may shutdown and restart more than one correlation server in parallel, as long as the correlation capacity of remaining correlation servers is sufficient to process the tracing data generated by the connected agents and as long as no corresponding primary and backup correlation server are shutdown simultaneously.

Referring now to FIG. 7 which visually illustrates how the disclosed monitoring system may react to compensate the unexpected unavailability of an intermediate node, e.g. due to a crash of the process executing an intermediate node.

Agents 102d and 102e are deployed to monitored processes and monitor and report the execution of distributed transactions by the processes they are deployed to. (Processes and monitored distributed transactions are not shown in FIG. 7)

Besides a server list 103 which is used by agents to select a target correlation server for new monitored transactions as described above, each agent also contains an intermediate node table 701d and 701e, which lists connection data and a usage priority of intermediate nodes of the monitoring system. The connection data column 702d and 702e contains data required to access a specific intermediate node over a computer network. The usage priority divides the available intermediate nodes into different priority levels. The priority levels may e.g. be set according to the quality and capacity of the network connection between the agent and the intermediate node or the success status of the latest attempt to use a specific intermediate node. The entries of an intermediate node table may differ from agent to agent, see e.g. the different entries of table 701d of agent 102d and table 701e of agent 102e. Also the priority of one intermediate node may differ from agent to agent. See e.g. entry 705d for intermediate node 3 130e in table 701d with a priority of 2 709d and entry 703e for the same intermediate node 3 130e in table 701e with a priority 1 707e.

In the situation depicted in FIG. 7, agent 1 102d uses intermediate node 2 130d to transfer 712 its trace data, as it provides the best network connection to agent 1 and thus also has the highest usage priority 707d for agent 1 102d. Agent 2 102e use intermediate node 3 130e as for agent 2, this intermediate node has the highest priority. Initially, intermediate node 1 130c is not used by agent 1 or agent 2. All intermediate nodes 130c, 130d and 130e forward 140e, 140f and 140g received transaction trace data to correlation servers of the correlation server cluster 150 according to the server identification specified in the transaction trace data as described earlier.

At a specific point in time, and while agent 1 is using intermediate node 2 130d, the intermediate node 2 crashes 720 and is no longer available to receive transaction trace data. Agent 1 still tries to send its transaction trace data to the intermediate node 2 130d and gets a connection refused error 711 on an attempt to send the monitoring data to intermediate node 2. In response to the connection refused error, agent 1 102d may select another intermediate node out of the intermediate nodes listed in its intermediate node table 701d considering the usage priority 702d of the listed intermediate nodes. Agent 1 102d may chose entry 704d/708d of its intermediate node table identifying intermediate node 1 130c with a usage priority of 2 708d as the only entry with a higher priority identifies an intermediate node 130 that is currently not available. Agent 1 may connect to intermediate node 1 130c and send subsequent transaction trace data to this intermediate node. Agent 1 may also resend transaction trace data unsuccessfully sent to intermediate node 2 to intermediate node 1.

The processing performed by components of the monitoring system to update the intermediate node lists of agents connected to a monitoring system on events like a startup and connection of an intermediate node to the monitoring system or its controlled or unexpected disconnection is shown in FIG. 8.

The processing performed on the event of a new intermediate node 130 joining the monitoring system is described in FIG. 8a. The process begins with step 801 when a new intermediate node is started and connects to a correlation server cluster 150. The process continues with step 802 in which the cluster determines the usage priority of the joining intermediate node for each connected agent. The configuration data of the cluster may contain data describing each agent and also the network topological position of each agent. The cluster also has information about the network topological position of the joining collector. Based on this data, the cluster may calculate a usage priority of the joining intermediate node for each agent.

Following step 803 distributes the connection data and usage priority of the new intermediate node to all connected agents. This may be implemented by a cyclic configuration data polling process performed by the agents to cyclically check changes of configuration data.

After connection data and usage priority are available at the agents, they may start using the new intermediate node or start considering it at their next intermediate node switch with step 804. The process then ends with step 805.

The processing performed by components of the monitoring system on the ordered shutdown of an intermediate node is shown in FIG. 8*b*. The process starts with step 810 when an intermediate node is selected to get shut down. Subsequent step 811 distributes the attempt to shut down an intermediate node to all connected agents. This may e.g. be performed by removing data describing the intermediate node from configuration data. Agents may get aware of the shutting down intermediate node by their cyclic polling for configuration data updates.

On receiving the attempt to shut down the intermediate node, agents that are currently using the shutting down intermediate node switch to another intermediate node in step 812, and in subsequent step 813, all agents select the entry of their intermediate node list 701 representing the shutting down intermediate node and either remove the entry from the intermediate node list, or mark it as currently unavailable intermediate node. This may e.g. be performed by assigning the shutting down intermediate node the lowest usage priority. This way, the agents would only try to use the shutting down intermediate node in the future if no other intermediate node is available. Following step 814 shuts down the selected intermediate node and the process then ends with step 815.

The handling of unexpected unavailability of an intermediate node, e.g. due to a crash of the process of the intermediate node is described in FIG. 8*c*. The process starts with step 820, when an intermediate node crashes. In following step 821, the agents currently using the intermediate node recognize that sending trace event records to this intermediate node fails and in response to the recognized communication failure switch to another intermediate node in their intermediate node list, considering the usage priority of the intermediate node list entries in their intermediate node tables (e.g. 701*d* and 701*e* in FIG. 7) to switch to the available intermediate node with highest usage priority.

In following step 823, the agents previously connected to the crashed intermediate node may resend the trace data records for which sending to the crashed intermediate node failed to the new selected intermediate node. As described in step 824, agents that detect a failure to communicate with an intermediate node may in response to the detected communication failure either remove the intermediate node from their intermediate node list or mark it as currently unavailable intermediate node and only try to access it in the future if no other intermediate node is available. The process then ends step 825.

Referring now to FIG. 9 which provides a flowchart describing the process of cyclic intermediate node switching which may e.g. be performed by agents to cyclically change the used intermediate node. Benefits of cyclic intermediate node switching are a more equally distributed load of intermediate nodes, and automatic usage of new deployed intermediate nodes by agents.

The process starts with step 901, either when the intermediate node usage time is elapsed, or the content of the intermediate node list 701 of an agent has changed, e.g. due to cyclic polling for configuration data updates. The intermediate node usage time may be any time period, practically it should not cause an intermediate node switch too often as this causes overhead. Typically, the intermediate node usage time ranges from 5 minutes to 15 minutes.

Subsequent step 902 determines the next intermediate node which should be used. In case no intermediate node entry with a higher usage priority than the one of the currently used intermediate node is available, this would be another intermediate node entry in the list with the same usage priority. The other intermediate node entry with same usage priority may be selected by using a round robin procedure, which selects the next entry with the same priority in the list if one is available and otherwise starts searching at the beginning of the list. In case intermediate nodes with higher priority are available, the intermediate node with the highest priority is selected.

Following decision step 903 checks if a next intermediate node could be determined. In case no next intermediate node could be found, the process ends with step 905.

Otherwise, the connection to the currently used intermediate node is shut down, and a new communication link with the next intermediate node is established. The process then ends with step 905.

The intermediate node switching process as described in FIG. 9 assures that intermediate nodes known to an agent are all used in a balanced way and that in case an update of the intermediate node table adds a new intermediate node entry with higher priority than the currently used intermediate node, the agent switches to the new intermediate node with higher usage priority. It is also noteworthy that the balanced intermediate node usage and switch to available intermediate nodes with higher priority is performed by the agents autonomously, without any explicit command sent from other components of the monitoring system like intermediate nodes or correlation servers.

In some embodiments of the disclosed technology, the transaction monitoring system may be used to monitor different applications provided by different organizations or application vendors. In such a setup, application vendors would register to the monitoring system as clients or tenants. In such an environment, it is desired to provide clients only access to transaction trace data originated from their application and deny access to transaction trace data originated from applications of other clients.

The clients or users of the monitoring system may register to the monitoring system and receive a client identifier that uniquely identifies a specific client within the monitoring system. On a request for transaction trace data by a specific client or user, the monitoring system would only return transaction trace data with the same client identifier as the client identifier of the specific client or user that requested the transaction trace data.

On installation of agents 102 by clients to monitor their application, a client may provide its client identifier, which may be stored in the agent local configuration and the agents may use their agent configuration to tag created trace event records with the client identifier received with their local configuration data. In such embodiments, trace event records may contain an additional field "client identifier" that contains the client identifier of the client that installed the agent that sent the trace event record. On processing the trace event records to create end-to-end transaction trace data, the correlation servers may use the client identifier to tag the end-to-end transaction trace data with a client identifier, which allows to assign each end-to-end transaction trace to a specific client and to restrict accessibility of end-to-end transaction trace data to the corresponding client.

In such a scenario with multiple clients and multiple applications, it becomes possible that monitored transactions travel between monitored processes controlled by different customers. Referring now back to FIG. 1 and assuming process 1 101a and process 2 101b would be owned or controlled by client A and process 3 101c would be owned or controlled by client B. Transactions T1 110a and T4 110d are completely executed by processes of one client and therefore their client relationship is unambiguous. T1 belongs to customer A, as it is executed only on processes controlled by customer A and T4 belongs to customer B as it is only executed by processes controlled by customer B.

For transactions T2 and T3, the situation is different, as both transactions use processes controlled by multiple customers. For those transactions their client relationship is ambiguous. To overcome this situation, transaction traces may be split when they cross client control boundaries. For transaction T3, entering the monitoring system via process 2 controlled by client A, transaction executions performed on process 2 would be assigned to T3, but with the call 111c of T3 to process 3 controlled by client B, transaction T3 would end and a new transaction T3', belonging to customer B would be started. This way, each client only sees transaction processing performed by processes controlled by the client. Processing performed by processes controlled by other clients is hidden, even if single transactions span processes controlled by different clients.

To achieve this client splitting behavior of monitored transactions, the correlation data transfer record 210 may be extended with a field client identifier, that is initialized with the client identifier of an agent that detects an outgoing call, e.g. as extension to step 312 of the process described in FIG. 3.

Step 303 of the process described in FIG. 3 which checks the availability of parent identification data to determine if a new transaction is started, may be extended to, on availability of parent identification data, further check if the received correlation data transfer record 210 contains a client identifier that is equal to the local client identifier of the receiving agent. Only if both client identifiers match, the process may continue with step 305 and creates transaction trace data allowing to link caller trace data with callee trace data. Otherwise, the process may continue with 304 by ignoring the parent identification data as it describes processing performed by a process controlled by another client and create transaction trace data indicating the start of a new monitored transaction. Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring transaction execution in a distributed computing environment, comprising:

determining, by an agent instrumented in a method, whether execution of the method is a first instance of execution caused by a given thread of a transaction executing in the distributed computing environment, where the agent is executed by a processor of a host computing device;

determining, by the agent, whether parent thread identification data is available from a parent thread that spawn the given thread;

extracting, by the agent, an identifier for a correlation server from data received by the agent from the parent thread and store the identifier for the correlation server in a data store residing on the host computing device, where the identifier for the correlation server is stored in association with an identifier for the given thread and an identifier for the transaction, and the extracting and storing of the identifier is in response to a determination that the execution of the method is a first instance of execution and a determination that the parent thread identification data is available;

selecting, by the agent, an identifier for one of a plurality of correlation servers, where the identifier is selected from a listing of the correlation servers stored on the host computing device;

storing, by the agent, the identifier for the selected correlation server in the data store, where the identifier for the selected correlation server is stored in association with an identifier for the given thread and the identifier for the transaction and the selecting and storing of the identifier is in response to a determination that the execution of the method is a first instance of execution and a determination that the parent thread identification data is not available;

retrieving, by the agent, the identifier for the correlation server from the data store in response to a determination that the execution of the method is not the first instance of execution;

creating, by the agent, a trace event that indicates start of execution of the given thread, where the trace event includes the identifier for the given thread, the identifier for the new transaction, the parent thread identification data if available, the identifier for the selected correlation server and at least one metric indicative of performance of the method, the creating of the trace event is in response to a determination that the execution of the method is a first instance of execution by the given thread; and sending, by the agent, the trace event across a network to the selected correlation server located remotely from the host computing device.

2. The method of claim 1 further comprises
determining, by the agent, whether execution of the method triggers start of or communication with another thread; and appending, by the agent, the identifier for the given thread and the identifier for the correlation server to a message that is used to start or communication with the another thread, where the appending is in response to a determination that the execution of the method does trigger start of or communicates with another thread.

3. The method of claim 2 further comprises
determining, by the agent, a customer from amongst a plurality of customers, where the customer controls the process that spawn the given thread; and appending, by the agent, an identifier for the customer to the message.

4. The method of claim 3 wherein determining whether identification data is available from a parent thread further comprises comparing, by the agent, an identifier for a customer received in data from the parent thread to a customer identifier associated with the agent;

ignoring, by the agent, the data received from the parent thread; and creating, by the agent, a trace event that indicates start of a new monitored transaction, where the ignoring and creating occur when the identifier for a customer in the data received from the parent thread does not match the customer identifier associated with the agent.

5. The method of claim 1 further comprises selecting the identifier for one of the plurality of correlation servers randomly.

6. The method of claim 1 further comprises selecting the identifier for one of the plurality of correlation servers based on resource load currently experienced by one or more of the plurality of correlation servers.

7. The method of claim 1 wherein sending the trace event further comprises sending the trace event to an intermediate node, where the intermediate node forwards the trace event to the selected correlation server and the intermediate node is located remotely from the host computing device and the selected correlation server.

8. The method of claim 7 further comprises
receiving, by the intermediate node, the trace event from the agent;

extracting, by the intermediate node, the identifier for the selected correlation server;

retrieving, by the intermediate node, a network address for the selected correlation server from a routing table; and sending, by the intermediate node, the trace event across a network to the selected correlation server using the network address.

9. The method of claim 8 further comprises
detecting, by the intermediate node, a failure condition with the selected correlation server;

selecting, by the intermediate node, a backup correlation server using a selection method, where the selection method is the same amongst a plurality of intermediate nodes; and sending, by the intermediate node, the trace event across the network to the backup correlation server.

10. The method of claim 8 further comprises:
receiving, by the selected correlation server, the trace event from the intermediate node;

determining, by the selected correlation server, whether the trace event indicates a new transaction being monitored;

creating, by the selected correlation server, a transaction record using data contained in the trace event, wherein the creating is in response to the determination that the trace event indicates a new transaction being monitored; and updating, by the selected correlation server, a transaction record using data contained in the trace event, wherein the updating is in response to the determination that the trace event is not a new transaction.

11. The method of claim 7 further comprises
periodically selecting, by the agent, another intermediate node from a listing of intermediate nodes maintained by the agent and stored on the host computing device; and sending, by the agent, subsequent trace events to the another intermediate node.

12. A computer-implemented method for monitoring transaction execution in a distributed computing environment, comprising:
  determining, by an agent instrumented in a method, whether execution of the method is a first instance of execution caused by a given thread of a transaction executing in the distributed computing environment, where the agent is executed by a processor of a host computing device;
  determining, by the agent, whether parent thread identification data is available from a parent thread that spawn the given thread;
  selecting, by the agent, an identifier for one of a plurality of correlation servers, where the identifier is selected from a listing of the correlation servers stored on the host computing device; and
  storing, by the agent, the identifier for the selected correlation server in a data store, where the identifier for the selected correlation server is stored in association with an identifier for the given thread and an identifier for the transaction and the selecting and storing of the identifier is in response to a determination that the execution of the method is a first instance of execution and a determination that the parent thread identification data is not available;
  retrieving, by the agent, the identifier for the correlation server from the data store in response to a determination that the execution of the method is not the first instance of execution and does not indicate the start of a new transaction executing in the distributed computing environment;
  creating, by the agent, a trace event that indicates start of execution of the given thread, where the trace event includes the identifier for the given thread, the identifier for the transaction, the parent thread identification data if available, the identifier for the selected correlation server and at least one metric indicative of performance of the method, the creating of the trace event is in response to a determination that the execution of the method is a first instance of execution by the given thread; and
  sending, by the agent, the trace event across a network to the selected correlation server located remotely from the host computing device.

13. The method of claim 12 further comprises
  extracting, by the agent, an identifier for a correlation server from data received by the agent from the parent thread and store the identifier for a correlation server in the data store residing on the host computing device, where the identifier for the correlation server is stored in association with an identifier for the given thread and an identifier for the transaction, and the extracting and storing of the identifier is in response to a determination that the execution of the method is a first instance of execution and a determination that the parent thread identification data is available.

14. The method of claim 12 further comprises
  determining, by the agent, whether execution of the method triggers start of or communication with another thread; and
  appending, by the agent, the identifier for the given thread and the identifier for the correlation server to a message that is used to start or communication with the another thread, where the appending is in response to a determination that the execution of the method does trigger start of or communicates with another thread.

15. The method of claim 14 further comprises
  determining, by the agent, a customer from amongst a plurality of customers, where the customer controls the process that spawn the given thread; and
  appending, by the agent, an identifier for the customer to the message.

16. The method of claim 15 wherein determining whether identification data is available from a parent thread further comprises
  comparing, by the agent, an identifier for a customer received in data from the parent thread to a customer identifier associated with the agent;
  ignoring, by the agent, the data received from the parent thread; and
  creating, by the agent, a trace event that indicates start of a new monitored transaction, where the ignoring and creating occur when the identifier for a customer in the data received from the parent thread does not match the customer identifier associated with the agent.

17. The method of claim 12 further comprises selecting the identifier for one of the plurality of correlation servers randomly.

18. The method of claim 12 further comprises selecting the identifier for one of the plurality of correlation servers based on resource load currently experienced by one or more of the plurality of correlation servers.

19. The method of claim 12 wherein sending the trace event further comprises sending the trace event to an intermediate node, where the intermediate node forwards the trace event to the selected correlation server and the intermediate node is located remotely from the host computing device and the selected correlation server.

20. The method of claim 19 further comprises receiving, by the intermediate node, the trace event from the agent;
  extracting, by the intermediate node, the identifier for the selected correlation server;
  retrieving, by the intermediate node, a network address for the selected correlation server from a routing table; and
  sending, by the intermediate node, the trace event across a network to the selected correlation server using the network address.

21. The method of claim 20 further comprises
  detecting, by the intermediate node, a failure condition with the selected correlation server;
  selecting, by the intermediate node, a backup correlation server using a selection method, where the selection method is the same amongst a plurality of intermediate nodes; and
  sending, by the intermediate node, the trace event across the network to the backup correlation server.

22. The method of claim 20 further comprises:
  receiving, by the selected correlation server, the trace event from the intermediate node;
  determining, by the selected correlation server, whether the trace event indicates a new transaction being monitored;
  creating, by the selected correlation server, a transaction record using data contained in the trace event, wherein the creating is in response to the determination that the trace event indicates a new transaction being monitored; and
  updating, by the selected correlation server, a transaction record using data contained in the trace event, wherein the updating is in response to the determination that the trace event is not a new transaction.

23. The method of claim 19 further comprises
periodically selecting, by the agent, another intermediate node from a listing of intermediate nodes maintained by the agent and stored on the host computing device; and
sending, by the agent, subsequent trace events to the another intermediate node.

\* \* \* \* \*